INVENTOR.
WALTER KUELLING
BY
ATTORNEYS

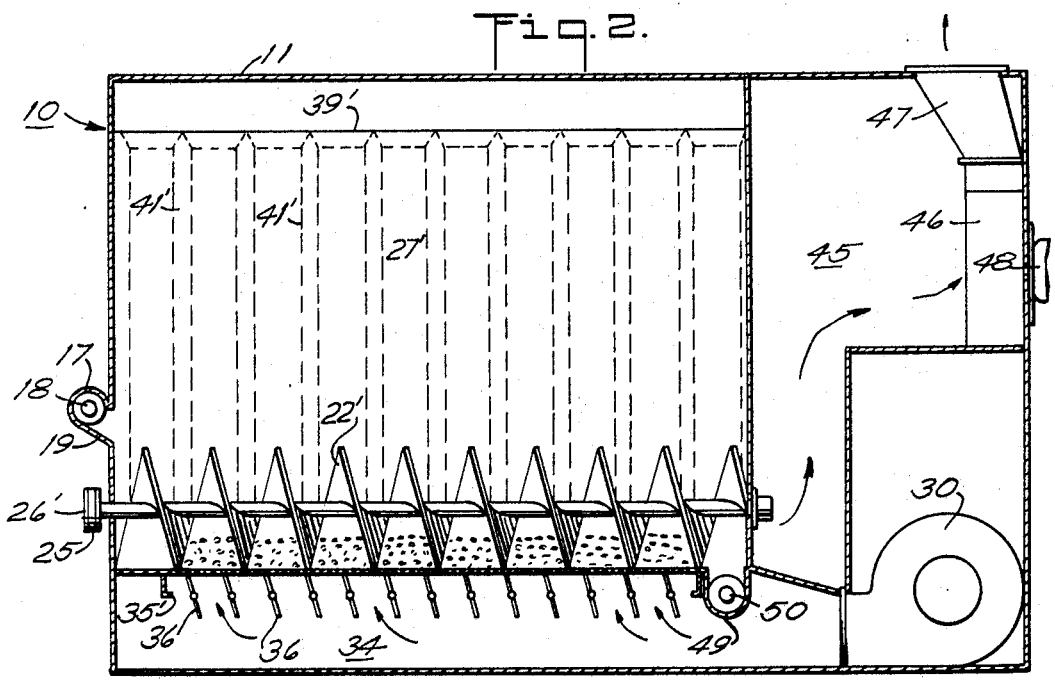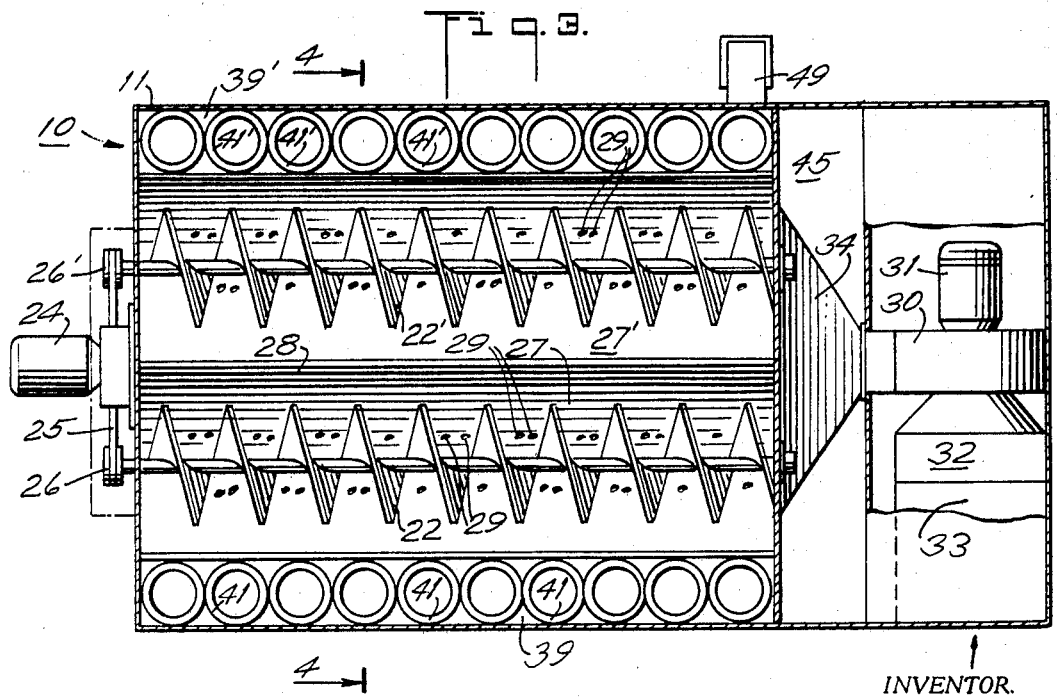

Nov. 4, 1969    W. KUELLING    3,475,832
CONTINUOUS FLUID BED DRYER
Filed Aug. 4, 1967    3 Sheets-Sheet 3

INVENTOR.
WALTER KUELLING
BY
ATTORNEYS

3,475,832
CONTINUOUS FLUID BED DRYER
Walter Kuelling, Muttenz, Basel, Switzerland, assignor to Process Equipment Engineering Co., Summit, N.J., a company of New Jersey
Filed Aug. 4, 1967, Ser. No. 658,453
Int. Cl. F26b 11/14, 3/08
U.S. Cl. 34—182                                         20 Claims

ABSTRACT OF THE DISCLOSURE

The product conveyor worms move the moist product longitudinally of the housing in a tortuous path about the worm shafts while streams of hot air are directed upwardly through the worms to fluidize the product. The quantity of air is controlled by dampers and is directed out of the housing through filter bags within side passages of the housing.

---

This invention relates to a continuous fluid bed dryer and a method of continuously drying solids. More particularly, the invention relates to a continuous fluid bed dryer for drying of pharmaceutical products.

The processing technique of employing a suspension or fluidization of small solid particles in a vertically rising stream of gas so that gas and solid come into intimate contact has come into use in pharmaceutical processes. A fluidized bed results when a fluid, usually a gas, flows upwardly through a bed of suitably sized, solid particles in a container at a velocity sufficiently high to buoy the particles, to overcome the influence of gravity, and to impart an appearance of turbulence similar to that of a violently boiling liquid. The fluid velocity must be intermediately between that which would lift the particles to maintain a uniform suspension and that which would sweep the particles out of the container. Such a velocity maintains the fluidized bed in a relatively stable condition of vigorous contacting of fluid and solids with a lower boundary at the point of fluid inlet and an upper definite and clearly marked boundary surface at which the gas leaves the fluidized bed. Where there is a temperature difference between the solid particles of the bed and the gas flowing through the fluidized bed, since there is relatively good solid to gas contact throughout the bed, a good heat transfer takes place between the solid particles and the gas. Thus, equalization of temperatures is rapidly achieved so that a charge of moist pharmaceutical feed powders can be granulated quickly. Similarly, there is an opportunity for mass transfer to and from the solid particles and between the solid particles and the gas.

Heretofore, in pharmaceutical processes, the technique of using a fluidized bed has generally been incorporated in fluid bed dryers of the batch type. In several of these batch type fluid bed dryers, a wet granulation is charged into a portable container which is then rolled into the lower portion of a closed cabinet induced-air unit and subsequently sealed within the cabinet. Thereafter, heated air is drawn through the granulation and exhausted through filters which retain the granulation within the drying zone of the container. As the heated air passes through the granulation, the granulation is lifted and maintained in a fluidized state while a transfer takes place between the particles of the granulation and the air so as to dehydrate the granulation.

However, since the batch type fluid bed dryers have had limited charge capacities, the output of such dryers has been relatively low. Further, such batch type dryers have required additional machinery or handling to move the charge containers into and out of the drying cabinets and, thus, have been time consuming and expensive.

In order to overcome the disadvantages of the batch type fluid bed dryers, continuous fluid bed dryers have been utilized. However, these continuous dryers have either been modified from existing batch equipment by incorporation of feed inlets and product outlets into the charge containers or have relied on conveyor belts to transport the product to be dried.

While the heretofore used continuous fluid bed dryers have generally overcome some of the disadvantages of the batch type dryers several disadvantages still exist. For example, the rate of output has been limited to relatively low rates since the drying zone of the modified batch type containers have been of limited size due to space and weight considerations for the container designed and the conveyor belts have been limited to the conveyance of relatively thin beds of product. Furthermore, in the modified batch type the temperature of the product within the container has usually not been capable of being uniformly controlled throughout the dehydration process. Also, in the conveyor belt type, the belts have been exceedingly long while saturation of the bed has not been efficient.

Accordingly, it is an object of the invention to provide a fluid bed dryer of the continuous type which is capable of a relatively high output rate.

It is another object of the invention to provide a fluid bed dryer of the continuous type wherein a product is conveyed longitudinally of the dryer during drying.

It is another object of the invention to provide a fluid bed dryer wherein the temperature of the product being dried can be controlled along the longitudinal length of the drying zone.

It is another object of the invention to provide a continuous fluid bed dryer which can be easily and rapidly cleaned between changes of product.

It is another object of the invention to provide a method for drying a continuous stream of moist feed powder.

It is another object of the invention to dry a fluidized bed of moist feed powder in a continuous efficient manner.

It is another object of the invention to dry a fluidized bed of moist feed powder at a relatively high rate.

It is another object of the invention to provide a method of controlling the temperature of a fluidized bed during drying.

Briefly, the invention provides a fluid bed dryer of a continuous type wherein a stream of product is continuously conveyed through a longitudinal drying zone. The fluid bed dryer has a product inlet at one end of the drying zone through which a moist product is introduced in a continuous manner into the drying zone for drying. The drying zone has at least one conveying means therein for receiving and conveying the moist product through the drying zone in a continuous manner. In addition, the drying zone cooperates with a hot air system so as to permit a plurality of longitudinally separated continuous streams of heated air to move in an upward manner through the moist product. The heated air delivered by the hot air system travels at a velocity so as to fluidize the moist product into a fluid bed and to dry the moist product. The several streams of heated air are controlled as to the amount of heated air passed into various locations along the drying zone so that a substantially uniform fluid bed is obtained through the length of the drying zone. Also, in one embodiment, the temperature of each heated air stream is controlled by separate air heaters so that the product passes through successive drying compartments of different temperatures while being conveyed through the drying zone.

The fluid bed dryer has a product discharge at the opposite end of the drying zone from the product inlet which receives and conveys the dried product from the drying zone out of the dryers. The product discharge operates in a continuous manner at a rate corresponding to the product input rate so that a substantially uniform process rate is achieved.

The invention provides a method for drying a continuous moving stream of product. The method includes an initial step of directing a moist product into at least one continuously moving longitudinal stream and a subsequent step of drying the product in stepwise fashion while moving the product in the stream. The drying step is carried out by forcing a plurality of streams of heated air upwardly through the moving product at various locations along the stream so as to fluidize and dry the product. The final step of the method comprises the continuous discharge of dried product from the stream at a rate corresponding to the product input rate so as to achieve a balanced process.

These and other objects and advantages of the invention will become more apparent from the following detailed description and appended claims taken in conjunction with the accompanying drawings in which:

FIG. 2 illustrates a cross sectional elevational view of the longitudinal drying zone of the fluid bed dryer of FIG. 1;

FIG. 3 illustrates a cross sectional plan view of the fluid bed dryer of FIG. 1;

Figure 1:
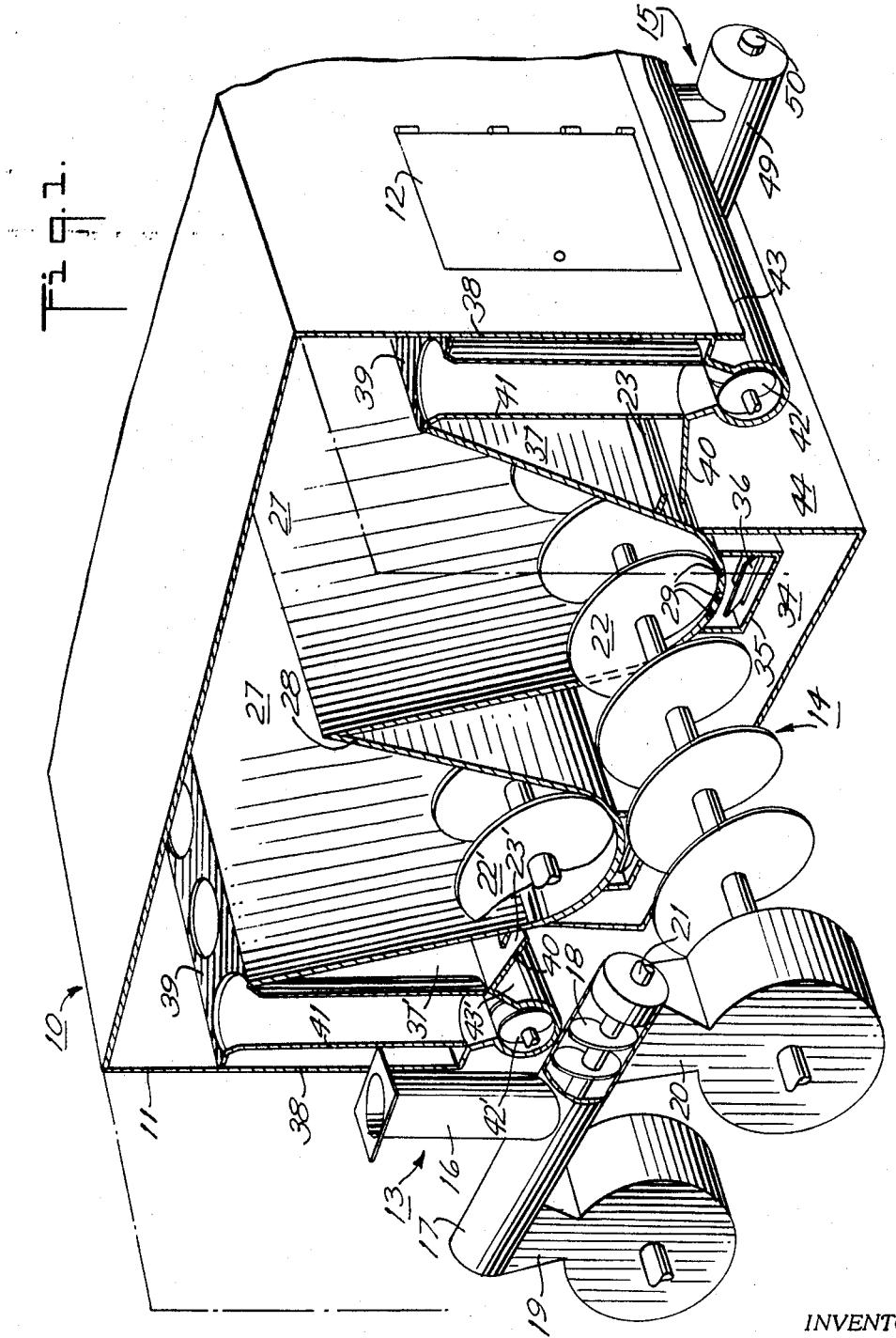
FIG. 1 illustrates a fragmentary perspective view of a fluid bed dryer according to the invention taken from the input end.

Referring to FIG. 1, the fluid bed dryer 10 has a housing 11 which is sealed to the exterior and provided with suitably positioned doors 12 for access to the interior. The housing 11 has a product inlet means 13 which communicates with one end of a drying zone 14 within the interior of the housing 11 and a product discharge means 15 which communicates with the opposite end of the drying zone 14.

The inlet means 13 includes an upstanding open-ended inlet socket 16, for example, of hollow cylindrical shape, which communicates at the lower end with a horizontal distributing tube 17. The socket 16 is sized to receive and direct a product charge, such as a moist feed powder, into the distributing tube 17, for example, at a central point. A distributing worm 18 is rotatably mounted within the distributing tube 17 to distribute the received product charge homogeneously between a pair of chutes 19, 20. With the chutes 19, 20 connected near the opposite ends of the distributing tube 17 the distributing worm 18 is constructed so as to direct the product received from the inlet socket 16 in two directions. For example, the worm 18 has one helix directed in a right hand sense on one end of the worm shaft 21 and a second helix directed in a left hand sense on the opposite end of the worm shaft 21. The worm 18 is driven through the worm shaft 21 by a motor (not shown) at a variable speed so that the input rate of product can be controlled.

Referring to FIGS. 1 and 3, the drying zone 14 in the housing 11 incorporates a pair of conveying means such as conveying worms 22, 22' therein in communication with the chutes 19, 20 for receiving the moist product charge. The conveying worms 22, 22' are rotatably mounted in suitable bearings longitudinally of the housing 11 and are driven by a common motor 24. For example, the motor 24 drives an endless belt 25 which is mounted on a pair of pulley wheels 26, 26' fixed to the ends of each conveying worms 22, 22' so that the worms are driven at the same speed.

Figure 4:
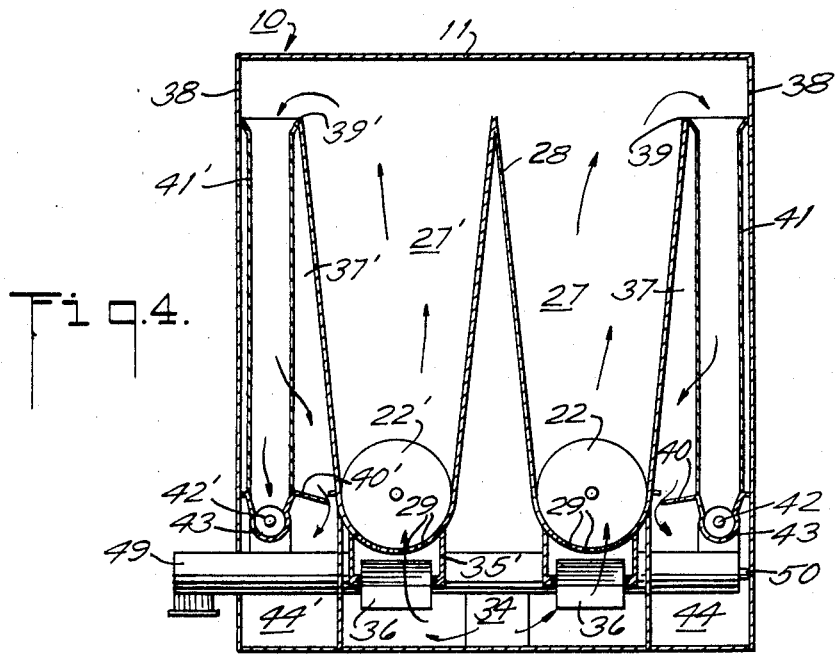
FIG. 4 illustrates a view taken on line 4—4 of FIG. 3.
Figure 5:
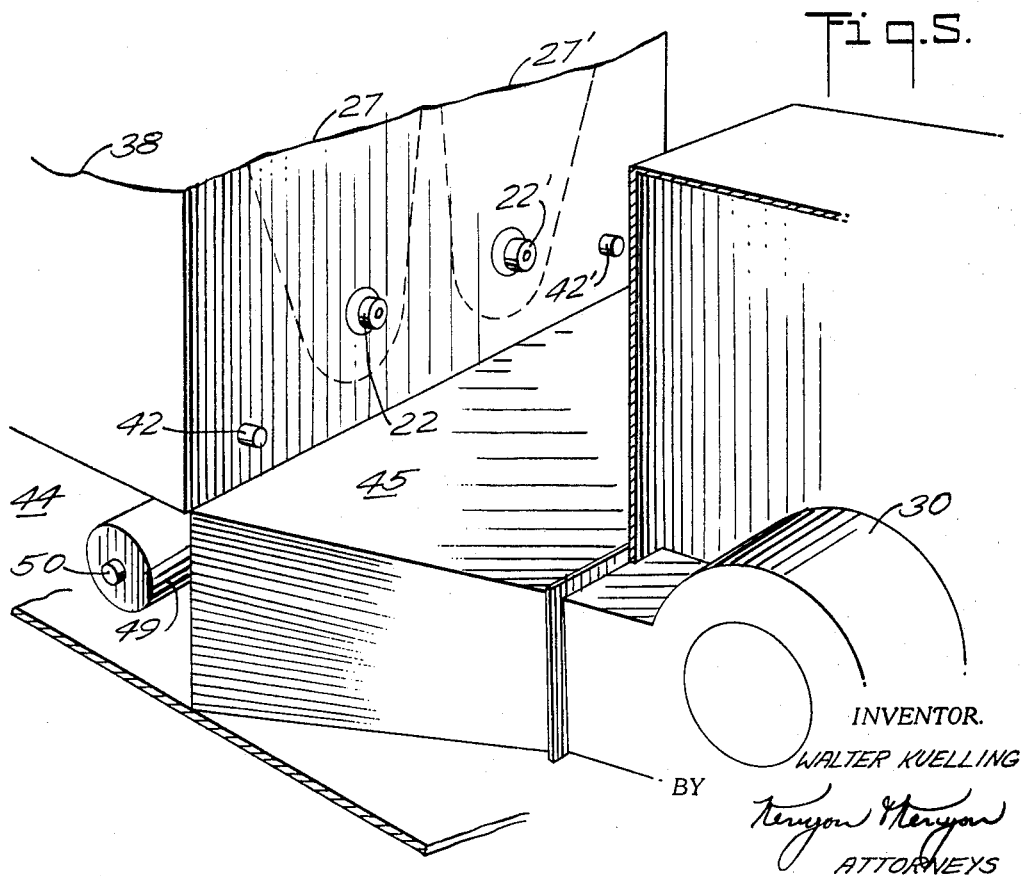
FIG. 5 illustrates a fragmentary perspective view of the discharge end of the dryer of FIG. 1.

Referring to FIGS. 1 and 4, the drying zone 14 is divided into a pair of drying chambers 27, 27' by an interior dividing plate 28 of generally W-shaped cross section. Each chamber which is shaped as an expansion chamber has one of the conveying worms 22, 22' disposed therein at the lower portion so that the product charge which is received and conveyed by the conveying worms 22, 22' is confined substantially to the lower portion of the chambers 27, 27'. The plate 28 is formed of a plurality of sections so as to form a series of adjacent drying compartments. In addition, the plate 28 is perforated with holes 29 in the region around the conveying worms longitudinally of the drying zone 14. The holes 29 are sized to prevent passage of the product and to provide a proper velocity profile for air directed therethrough.

Referring to FIGS. 2, 3 and 4, the drying zone 14 of the housing 11 also has an air supply system incorporated therein for fluidizing the product in the drying chambers 27, 27'. The air supply system includes an air blower fan 30 near the discharge end of the housing 11 which is driven by a motor 31, an air heater 32 upstream of the fan 30 and a pre-filter 33 upstream of the heater 32 which communicates with the exterior of the housing 11. The exhaust end of the blower fan 30 communicates directly with an enclosed main air chamber 34 longitudinally beneath the plate 28 so as to direct a stream of air into the chamber 34 at a relatively high velocity. A pair of secondary air chambers 35, 35' are disposed longitudinally of the housing 11 in communication with the main air chamber 34. Each secondary chamber 35, 35' is secured in a sealed depending manner from the plate 28 below a drying chamber 27, 27' and includes a plurality of longitudinally aligned dampers 36. Each damper 36 is pivotally mounted in the floor of a secondary air chamber 35 below a drying compartment of the drying chambers 27, 27'. Each damper 36 is controlled by a suitable pivoting means (not shown) to pivot between a fully closed position which seals the secondary air chamber from the main air chamber and a fully open position which exposes the secondary air chamber to a flow of air from the main air chamber. Thus, the forced stream of air delivered from the blower fan 30 into the main air chamber 34 can be divided into a plurality of upwardly directed streams by the dampers 36 of the secondary air chambers 35, 35' and passed through the holes 29 into the drying chambers 27, 27'. The dampers 36 can further be set to control the quantity of air passing through the secondary air chambers 35, 35'.

In addition, a pair of longitudinal chambers 37, 37' are disposed between the walls 38 of the housing 11 and the plate 28 in parallel relation to the drying chambers 27, 27'. Each chamber 37 is defined by an apertured upper plate 39 secured between the edge of the plate 28 and a housing wall 38 and a lower plate 40 secured to the housing wall 38. The upper and lower plates 39, 40 are apertured along their length and filter bags 41 are placed between each pair of vertically aligned apertures to form passageways from the drying chambers 27, 27' through the chambers 37, 37'. The material from which the filter bags 41 are made permit the flow of air passing from the drying chambers 27, 27' to pass through the walls of the filter bags into the chambers 37, 37' and out the air outlets 40. In addition, the apertures in plate 39 communicate with auxiliary conveying worms 42, 42' rotatably mounted directly below the filter bags 41 within suitably sealed covers 43, 43' so that the drying chambers are in direct communication with the auxiliary conveying worms 42, 43'. The auxiliary conveying worms 42, 42' are driven off suitable independent motors (not shown) or, are driven by means of a suitable gear train from motor 24.

Referring to FIG. 3, each longitudinal chambers 37, 37' communicates through air outlet 23, 23' with an air passage 44, 44' within the housing 11. The air passages 44, 44' extend longitudinally of the drying chambers 27, 27' to open into an exhaust air chamber 45 positioned downstream of the drying chambers 27, 27'. The exhaust air chamber 45 has an exhaust fan 46 disposed therein to receive the air from passages 44, 44' under a sufficient suction to only overcome the filter resistance and the outlet resistances and to exhaust the air out of the housing 11 through a flue 47. The fan 46 is driven through a motor 48 secured to an end wall of the housing 11.

Referring to FIGS. 1 and 2, the product discharge means 15 includes a passageway 49 at the downstream end of the conveying worms 22, 22' which communicates the drying chambers 27, 27' with the exterior of the housing 11. A discharge conveying worm 50 is rotatably mounted in the passageway 49 and driven by a suitable motor (not shown) to convey dried product from the drying chambers out of the housing 11 in a vertical direction.

In operation, a moist product is introduced into the inlet socket 16 of the inlet means 13 at a predetermined continuous rate. The product is then homogeneously distributed by the rotating distributing worm 18 into the drying chambers 27, 27'. As the conveying worms 22, 22' rotate, the moist product received in the drying chambers is conveyed under the action of the conveying worms in tortuous path about the rotating conveying worms and longitudinally of the drying zone 14. At the same time, a stream of air which is filtered and heated in the filter 33 and heater 32 is forced from the blower fan 30 through the main air chamber 34 into the secondary air chambers 35, 35' and then into the drying chambers 27, 27' through the holes 29. The air is passed upwardly through the drying chambers 27, 27' at a velocity sufficient to fluidize the particles of the moist product. Also, the air is of a temperature to permit an efficient heat transfer from the heated air to the particles to dry the particles. The heavier particles of the product are maintained within the area of the conveying worms 22, 22' while in the fluidized bed; however, the relatively light dust particles are transported into the upper expansion regions of the drying chambers 27, 27'. Should any light dust particles be carried out of the drying chambers 27, 27', such are filtered out of the streams of air by the filter bags 41, 41'. An accumulation of dust particles on the interior of the filter bags is shaken off, for example, by an automatic shaker mechanism (not shown), and deposited in the auxiliary conveying worms 42, 42'. When it is necessary to separate these dust particles out of the dryer 10, the auxiliary conveying worms are connected at their downstream ends to suitable outlet sockets (not shown) for disposal. However, where the dust particles are not objectionable, the auxiliary conveying worms 42, 42' communicate with the discharge conveying worm 50 in the discharge means 15 to deposit the dust particles into the dried product leaving the dryer 10.

In passing from the main air chamber 34 into the secondary air chambers 35, 35', the heated stream of air is divided into a plurality of throttled streams by means of the dampers 36. Each throttled stream of air is controlled as to quantity since the moist product at the upstream end of the drying chambers requires a greater quantity of air to be fluidized than the pre-dried product in the remainder of the drying chambers. As each stream of heated air passes through one of the drying compartments of the drying chambers, the particles of the product therein are buoyed up by the air stream so that a fluidized bed is formed. At the same time, since the air is at a higher temperature than the product particles, a heat transfer takes place between the air and the particles. This heat transfer causes the particles to give off any moisture so that the product mass begins to dry out. The product is thus continuously dried during movement through the drying chambers.

After passing through the relatively thick fluidized bed of product, the air reaches the uppermost region of the drying chambers 27, 27'. At this point the air is at a pressure of approximately zero so as to preclude the carrying-out of any product particles from the drying chambers. The air is then directed through the passageways formed by the filter bags 41, 41' and filtered into the longitudinal chambers 37, 37' under the suction force of the fan 46. Should any particles be carried by the air streams out of the drying chambers, such particles are filtered out onto the interior walls of the filter bags 41, 41' for subsequent depositing into the auxiliary conveying worms 43, 43'. The air is then directed into the exhaust chamber 45 and expelled out of the housing 11 through the flue 47 by the exhaust fan 46.

Upon reaching the downstream end of the drying chambers, the product which has been conveyed by the conveying worms and dried under the action of the heated air streams, is deposited into the discharge passageway 49 and conveyed out of the housing 11 by rotation of the discharge conveying worm 50. The dried product is discharged from the housing 11, for example, in a vertical direction so as to be conveniently deposited in hoppers or other containers for delivery into other apparatus such as tablet makers for other processing.

The conveying worms 22, 22' and drying chambers 27, 27' are sized with respect to the particles of the product to be dried so as to effect a relatively thick bed of particles. This permits a greater quantity of air to be used than otherwise possible with flat conveyor belts so that a relatively greater saturation of the air carrying particles is achieved. In addition, where the bed dryer 10 is used for products which are difficult to fluidize or which tend to form channels, shovel-shaped plates can be fixed to the conveying worms, for instance, at the periphery. Such shovel-shaped plates can be designed individually for the nature of the product to be handled so as to prevent the formation of channels as well as to crush any lumps in the product.

The motor 24 which drives the conveying worms 22, 22' is provided with a continuously adjustable variator for adjusting the speed at which the conveying worms are driven. This permits the product being dried to be contained within the individual compartments of the drying chambers for a greater or less time as required. Also, by increasing the speed of the conveying worms overheating of the dried product can be avoided.

Further, in order to control the heating of the product particles, an air heater can be mounted below each compartment of the drying chambers 27, 27' to heat the stream of air passing into each compartment to an individual temperature. For example, in the first compartment, the heater may be set to heat the air to a temperature which effects drying of the product at a temperature of 80° C., and in subsequent compartments downstream of the first, the heater may be set to effect succeeding temperatures of 60° C., 50° C. and finally 40° C. Conversely, the highest temperature can also be obtained in the last compartment with the lowest temperature in the first compartment.

Where the product being dried has a relatively high content of water (i.e. above 20%) the air passing through the fluidized bed is almost completely saturated with water vapor. Consequently, the saturated air is expelled to the atmosphere directly through the flue 47. However, for products of low moisture content, part of the expelled air can be recirculated by means of a recirculating air channel (not shown) with the fresh air through the drying chambers. Further, in order to prevent the heated air directed into the drying chambers from escaping through the inlet socket and discharge passageway, the exhaust fan 46 is set with respect to the blower fan 30 so that neither an underpressure nor an overpressure prevails within the housing 11. In this matter, the air volume of the fans is effected by suitable air control flaps fitted to the two fans.

The invention provides a fluid bed dryer which is capable of continuously drying a product at a relatively high rate. For example, with a pair of conveying worms 22 each of a diameter of about 41½ inches, a drying zone of about 14¾ feet in length and 13⅙ feet in width, a dryer of the invention can process about 4,000 pounds of material per hour. Further, the fluid bed dryer is capable of drying out products with moisture contents in the range of from 20% to 60%; however, with most pharmaceutical products the moisture range is generally between 20% to 25%. Also, the fluid bed dryer is capable of drying out a moisture laden product at a relatively high rate, for example, at 1% of moisture per 1 minute of processing time. The dryer may operate at any temperature, for example, at 300° C.; however, the normal range is generally 50° C. to 80° C.

The dryer of the invention is of relatively compact nature in that it can be of limited dimension. For example, for a drying zone of a size as above, the housing is of an overall length of 23 feet and a width of about 16½ feet.

It is noted that the fluid bed dryer of the invention can be equipped with observation glasses for viewing the interior of the housing 11. For example, the side doors 12 can be equipped with observation windows and the side walls of the drying compartments can be provided with observation glasses for observation of the drying cycle at any time from the outside.

It is also noted that the drying machine is constructed so that it may be cleaned between product changes in a minimum of time. Where the interior of the housing is to be cleaned suitable water sprayers can be used within the housing to clean the conveying worms and housing interior. In such a case, a water outlet is fitted into the deepest part of the dryer for run off. The water outlet may preferably be connected into a nearby sewerage disposal system. Since the filter bags are secured within the dryer in a relatively simple manner, the bags can be easily dismantled and washed in a washing machine.

Where required, all parts of the dryer which come into contact with the product are made of stainless steel. In addition, the outer walls are spray-painted with a synthetic resin lake or epoxies. Alternatively, the entire dryer can be made entirely of stainless steel.

What is claimed is:

1. A fluid bed dryer for drying moist products comprising:
    a housing;
    a product inlet means at one end of said housing for introduction of a moist product into said housing;
    a pair of conveying means within said housing in communication with said product inlet means for receiving and transporting the moist product;
    a hot air system within said housing for directing at least one stream of heated air vertically upwardly through each said conveying means and the moist product in each said conveying means to fluidize and dry the moist product;
    a shaped plate disposed within said housing to define a pair of drying chambers with one of said conveying means confined in each respective drying chamber vertically above said hot air system and a pair of longitudinal chambers with said housing, said plate having a plurality of holes therein below each said conveying means for passage of said stream of heated air therethrough into said respective drying chamber from said hot air system, and a plurality of longitudinally disposed apertures in the upper ends communicating said drying chambers with said longitudinal chambers for passage of each said air stream from said drying chambers into said longitudinal chambers; and
    a product discharge means downstream of said inlet means in communication with said conveying means for receiving and conveying a dried product therefrom out of said housing.

2. A fluid bed dryer as set forth in claim 1 wherein each said longitudinal chamber communicates with the exterior of said housing for expelling of the air stream therefrom.

3. A fluid bed dryer as set forth in claim 1 which further comprises an auxiliary conveyor in the bottom of each said longitudinal chamber for conveying dust particles carried over from said drying chamber longitudinally of said housing.

4. A fluid bed dryer as set forth in claim 3 wherein said auxiliary conveyor communicates with said discharge means for depositing of conveyed dust particles therein.

5. A fluid bed dryer for drying a moist product comprising:
    a sealed housing;
    a product inlet means at one end of said housing for introduction of a moist product into said housing;
    a shaped plate within said housing defining a pair of drying chambers longitudinally of said housing, said plate having a plurality of holes at the bottom of each chamber;
    a pair of conveying worms, each of said conveying worms being disposed within a respective one of said drying chambers above the holes in said plate in communication with said product inlet means;
    a heated air system within said housing for directing a stream of heated air upwardly through said drying chambers to dry the moist product therein;
    passage means including a pair of chambers adjacent said drying chambers and communicating with the upper end of said drying chambers to receive air passing out of said drying chambers and to direct the air out of said housing; and
    a product discharge means downstream of said inlet means in communication with said conveying worms for receiving and conveying dried product therefrom out of said housing.

6. A fluid bed dryer as set forth in claim 5 wherein said air system includes a heater for heating a flow of air passing therethrough, and a blower fan downstream of said heater for directing the flow of air at a predetermined velocity into said drying chambers.

7. A fluid bed dryer as set forth in claim 6 wherein said air system further includes an exhaust fan in said passage means for expelling the air under a suction force from said housing.

8. A fluid bed dryer as set forth in claim 6 wherein said air system further includes a filter between said heater and said blower fan for filtering the air passing through said heater into said blower fan.

9. A fluid bed dryer as set forth in claim 6 wherein said air system further includes a plurality of filter bags in said passage means for filtering the flow of air from said drying chambers.

10. A fluid bed dryer as set forth in claim 9 further comprising auxiliary conveying worms within said chambers of said passage means below said filter bags for receiving filtered out particles therefrom, said auxiliary conveying worms being rotatably mounted in said housing to convey received particles out of said housing.

11. A fluid bed dryer as set forth in claim 5 wherein said air system includes a plurality of pivotally mounted dampers below said plate in the path of the stream of heated air for controlling the quantity of air directed into compartments of said drying chambers.

12. A fluid bed dryer as set forth in claim 5 wherein said plate is W-shaped.

13. A fluid bed dryer for drying a moist product comprising
    a pair of conveying worms disposed in parallel for conveying the moist product in a tortuous path longitudinally thereof in a pair of streams in the same direction;
    inlet means at one end of said conveying worms for directing the moist product simultaneously onto both said conveying worms;
    discharge means at the opposite end of said conveying worms for receiving dried product from said conveying worms; and
    an air system for directing at least one stream of heated air vertically upwardly through the moist product on each said conveying worms to fluidize and dry the moist product.

14. A fluid bed dryer as set forth in claim 13 which further comprises a common motor operably connected to said pair of conveying worms for rotating each conveying worm at the same speed.

15. A fluid bed dryer as set forth in claim 13 wherein said inlet means is in communication with each said conveying worm and includes distributing means for homogeneously distributing a moist product between said pair of conveying worms.

16. A fluid bed dryer as set forth in claim 15 wherein said distributing means includes a rotatably mounted distributing worm having a pair of oppositely directed helices therein for directing product in opposite directions towards said conveying worms.

17. A fluid bed dryer as set forth in claim 15 wherein said discharge means is in communication with each said conveying worm and includes a rotatably mounted discharge conveying worm for directing received dried product away from said pair of conveying worms.

18. A fluid bed dryer comprising
a housing;
a plate disposed longitudinally within said housing defining a pair of adjacent expansion drying chambers and a pair of spaced longitudinal chambers with said housing, said plate having a plurality of holes in the bottom thereof in communication with said drying chambers and a plurality of apertures in the top thereof communicating said drying chambers with said longitudinal chambers;
a product inlet means at one end of said housing in communication with said drying chambers for delivery of a moist product thereinto;
a pair of conveying worms, each said conveying worm being rotatably mounted in the bottom of a respective drying chamber above the holes in said plate for conveying the moist product in a tortuous path longitudinally of said drying chamber;
a heated air system for directing heated air upwardly through said drying chambers to fluidize and dry the moist product therein, said air system including a blower fan for directing stream of air into said housing, a heater for heating said stream of air, a main chamber for channeling said heated stream of air under said drying chambers, a pair of secondary air chambers mounted on said plate between said main chamber and the holes in said plate, each secondary air chamber having a plurality of pivotally mounted dampers therein for dividing the heated air stream into a plurality of upwardly directed streams of air longitudinally of said drying chambers to dry the product in said drying chambers, and an exhaust fan communicating with said longitudinal chambers for expelling the air passage from said drying chambers into said longitudinal chambers; and
a discharge means downstream of said conveying worms for receiving dried product therefrom and for discharging the received dried product of said housing.

19. A fluid bed dryer as set forth in claim 18 which further includes a plurality of filter bags within each said longitudinal chamber for filtering the air passing from said drying chambers into said longitudinal chambers and an auxiliary conveying worm rotatably mounted in each said longitudinal chamber below said filter bags for receiving filtered out particles from said filter bags.

20. A fluid bed dryer as set forth in claim 19 wherein each said auxiliary conveying worm communicates with said discharge means to deposit received particles therein.

References Cited

UNITED STATES PATENTS

| 40,130 | 9/1863 | Sutton et al. | 34—180 X |
| 523,237 | 7/1894 | Prinz | 198—217 |
| 1,989,751 | 2/1935 | Hagler et al. | 34—180 |
| 2,308,883 | 1/1943 | Kettenbach | 34—182 X |
| 2,444,383 | 6/1948 | Stynler | 34—182 |
| 2,501,487 | 3/1950 | Whitman | 34—577 |
| 2,636,284 | 4/1953 | Napier | 34—182 |
| 2,911,730 | 11/1959 | Schaub et al. | 34—181 X |
| 3,269,029 | 8/1966 | Moss et al. | 34—182 |

FOREIGN PATENTS

| 843,705 | 8/1960 | Great Britain. |

FREDERICK L. MATTESON, JR., Primary Examiner
ROBERT A. DUA, Assistant Examiner